United States Patent
Choi et al.

(10) Patent No.: US 8,750,497 B2
(45) Date of Patent: Jun. 10, 2014

(54) CRYPTOGRAPHIC DEVICE FOR IMPLEMENTING S-BOX

(75) Inventors: Hong-Mook Choi, Bucheon-si (KR); Xingguang Feng, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 778 days.

(21) Appl. No.: 12/889,854

(22) Filed: Sep. 24, 2010

(65) Prior Publication Data

US 2011/0129085 A1 Jun. 2, 2011

(30) Foreign Application Priority Data

Dec. 1, 2009 (KR) ........................ 10-2009-0117881

(51) Int. Cl.
*H04K 1/00* (2006.01)
*H04L 9/00* (2006.01)

(52) U.S. Cl.
USPC .............................................................. 380/29

(58) Field of Classification Search
None
See application file for complete search history.

(56) References Cited

U.S. PATENT DOCUMENTS

| | | | | |
|---|---|---|---|---|
| 5,796,837 | A * | 8/1998 | Kim et al. ........................ | 380/28 |
| 7,502,464 | B2 | 3/2009 | Macchetti et al. | |
| 7,545,933 | B2 | 6/2009 | Kunemund | |
| 7,856,099 | B2 * | 12/2010 | Brier et al. ........................ | 380/28 |
| 2004/0228482 | A1 * | 11/2004 | Macchetti et al. .............. | 380/28 |
| 2006/0177052 | A1 * | 8/2006 | Hubert ............................ | 380/29 |
| 2008/0143561 | A1 * | 6/2008 | Miyato et al. .................... | 341/79 |
| 2009/0055458 | A1 * | 2/2009 | O'Neil ........................... | 708/400 |
| 2009/0245510 | A1 * | 10/2009 | Ciet et al. ........................ | 380/29 |
| 2010/0002872 | A1 * | 1/2010 | Shibutani et al. ............... | 380/28 |
| 2010/0115286 | A1 * | 5/2010 | Hawkes et al. ................ | 713/189 |
| 2010/0329450 | A1 * | 12/2010 | Rarick et al. .................... | 380/29 |

FOREIGN PATENT DOCUMENTS

| | | |
|---|---|---|
| JP | 2006-229485 A | 8/2006 |
| KR | 10-2009-0079664 A | 7/2009 |
| WO | WO 2006033013 A2 * | 3/2006 |

OTHER PUBLICATIONS

Gulliver, Aaron T., Heuristic S-box Design, 2008, Contemporary Engineering Sciences, vol. 1, 2008, No. 4, pp. 147-168.*

Giaconia, Matteo et al., "Area and Power Efficient Synthesis of DPA-Resistant Cryptographic S-Boxes", 20th International Conference on VLSI Design, IEEE 2007, 7 pages.

* cited by examiner

*Primary Examiner* — Farid Homayounmehr
*Assistant Examiner* — Olanrewaju Bucknor
(74) *Attorney, Agent, or Firm* — Sughrue Mion, PLLC

(57) ABSTRACT

Provided is a cryptographic device implementing an S-Box of an encryption algorithm using a many-to-one binary function. The cryptographic device includes: arrays of first logic gates including I first logic gates which each receive 2 bits of an input signal; $2^N$ second logic gates which each receive corresponding J bits from among I bits output from the arrays of the first logic gates; and L third logic gates which each receive K bits from among $2^N$ bits output from the second logic gates, wherein there is a many-to-one correspondence between the N bits of the input signal and the K bits input to each of the third logic gates, and wherein the N, I, J, K, and L are positive integers. Because a signal output from each array includes only one active bit, current is always consumed constantly to prevent internal data from leaking out to a hacker.

25 Claims, 6 Drawing Sheets

Fig. 4

| S1 \ A4A3A2A1 | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| A5A0 00 | 0000 | 0001 | 0010 | 0011 | 0100 | 0101 | 0110 | 0111 | 1000 | 1001 | 1010 | 1011 | 1100 | 1101 | 1110 | 1111 |
| 01 | 1110 | 0100 | 1101 | 0001 | 0010 | 1111 | 1011 | 1000 | 0011 | 1010 | 0110 | 1100 | 0101 | 1001 | 0000 | 0111 |
| 10 | 0000 | 1111 | 0111 | 0100 | 1110 | 0010 | 1101 | 0001 | 1010 | 0110 | 1100 | 1011 | 1001 | 0101 | 0011 | 1000 |
| 11 | 0100 | 0001 | 1110 | 1000 | 1101 | 0110 | 0010 | 1011 | 1111 | 1100 | 1001 | 0111 | 0011 | 1010 | 0101 | 0000 |
| | 1111 | 1100 | 1000 | 0010 | 0100 | 1001 | 0001 | 0111 | 0101 | 1011 | 0011 | 1110 | 1010 | 0000 | 0110 | 1101 |

CRYPTOGRAPHIC DEVICE FOR IMPLEMENTING S-BOX

CROSS-REFERENCE TO RELATED APPLICATION

This application claims priority from Korean Patent Application No. 10-2009-0117881, filed on Dec. 1, 2009 in the Korean Intellectual Property Office, the entirety of which is hereby incorporated by reference.

BACKGROUND

1. Field

Apparatuses and methods consistent with exemplary embodiments relate to a cryptographic device.

2. Description of Related Art

In recent years, information transmitted by a user in communications using a smart card or an integrated circuit (IC) card, Internet communications, wireless local area network (LAN) communications, and Internet banking include secret information. Secret information may be leaked by hacking. Therefore, hardware encryption/decryption devices are increasingly being used to prevent the leakage of secret information. Prior to transmission of secret information receiving a signature or passing an authentication procedure, the hardware encryption/decryption device transforms the secret information into a cryptogram.

Because speed of an encryption operation is typically low, most encryption operations are carried out using hardware to be applied to devices such as a smart card. Data encryption standard (DES) is a type of block encryption algorithm and a symmetric key encryption scheme using 56 bits of a key. A substitution box (hereinafter referred to as "S-Box") for use in DES carries out a substitution operation to convert an m-bit input into an n-bit output.

When DES is embodied with hardware, an S-Box is designed using a lookup table. However, a data value of the S-Box may be exposed to a hacker according to a hardware design technique. Accordingly, there is a need for the hardware design for an S-Box that is capable of preventing exposure of internal data even when the S-Box is attacked by a hacker.

SUMMARY

Exemplary embodiments provide a cryptographic device.

According to an aspect of an exemplary embodiment, there is provided a cryptographic device including: arrays of first logic gates including I first logic gates each receiving 2 bits from among N bits of an input signal, where I and N are positive integers; $2^N$ second logic gates each receiving corresponding J bits from among I bits output from the arrays of first logic gates, where J is a positive integer; and L third logic gates each receiving K bits from among $2^N$ bits of signal output from the second logic gates, where L and K are positive integers, wherein the I bits, the $2^N$ bits, and L bits respectively output from the arrays of the first logic gates, the second logic gates, and the third logic gates each have only one active bit, and there is a many-to-one correspondence between the N bits of the input signal and the K bits input to each of the third logic gates.

According to an aspect of an exemplary embodiment, there is provided a cryptographic device including: an array of first logic gates receiving first 2 bits among 6 bits of an input signal and outputting first 4 bits; an array of second logic gates receiving second 2 bits among the 6 bits of the input signal and outputting second 4 bits; an array of third logic gates receiving third 2 bits among the 6 bits of the input signal and outputting third 4 bits; 64 forth logic gates each receiving corresponding 3 bits from among the 4 bits output from the arrays of the first, second, and third logic gates; and 16 fifth logic gates each receiving 4 bits from among the 64 bits output from the fourth logic gates, wherein the 4 bits, the 64 bits, and the 16 bits respectively output from the arrays of the first, second, and third logic gates, the fourth logic gates, and the fifth logic gates each have only one active bit, and there is a many-to-one correspondence between the 6 bits of the input signal and the 4 bits input to each of the fifth logic gates.

According to an aspect of another exemplary embodiment, there is provided a cryptographic device including: a first decoder which decodes an input signal of N bits into $2^N$ bits; and a second decoder which decodes the $2^N$ bits output from the first decoder into L bits, wherein the $2^N$ bits output from the first decoder and the L bits output from the second decoder each include only one active bit, and wherein N and L are positive integers.

According to an aspect of another exemplary embodiment, there is provided a cryptographic method including: receiving, at each of arrays of first logic gates comprising I first logic gates, 2 bits from among N bits of an input signal; receiving, at each of $2^N$ second logic gates, corresponding J bits from among I bits output from the arrays of the first logic gates; and receiving, at each of L third logic gates, K bits from among $2^N$ bits output from the second logic gates, wherein the I bits, the $2^N$ bits, and L bits respectively output from the arrays of the first logic gates, the second logic gates, and the third logic gates each have only one active bit, wherein there is a many-to-one correspondence between the N bits of the input signal and the K bits input to each of the third logic gates, and wherein the N, I, J, K, and L are positive integers, respectively.

BRIEF DESCRIPTION OF THE DRAWINGS

Exemplary embodiments will become more apparent in view of the attached drawings and accompanying detailed description. The exemplary embodiments depicted therein are provided by way of example, not by way of limitation, wherein like reference numerals refer to the same or similar elements. The drawings are not necessarily to scale, emphasis instead being placed upon illustrating aspects of the exemplary embodiments, wherein:

FIG. 4 illustrates an S-Box lookup table according to an exemplary embodiment;

DETAILED DESCRIPTION OF EXEMPLARY EMBODIMENTS

Exemplary embodiments will now be described more fully hereinafter with reference to the accompanying drawings.

Figure 1:
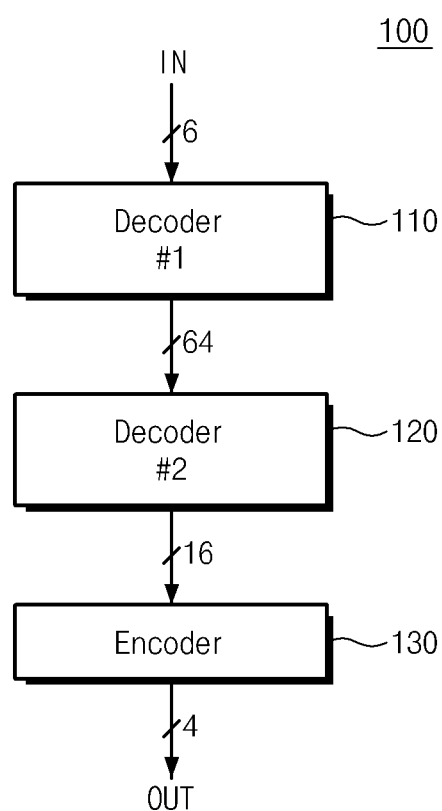
FIG. 1 illustrates a cryptographic device according to an exemplary embodiment.

FIG. 1 illustrates a cryptographic device 100 according to an exemplary embodiment. As illustrated, the cryptographic device 100 includes a first decoder 110, a second decoder 120, and an encoder 130. The first decoder 110 receives an input signal IN which is 6 bits and outputs 64 bits. The 64 bit output from the first decoder 110 includes one active bit from among the 64 bits according to the 6 bits of the input signal IN.

The second decoder 120 decodes the 64 bits from the first decoder 110 into 16 bits. Irrespective of a value of the 6 bits of the input signal IN, power consumed in the first and second decoders 110 and 120 is constantly maintained. As a result, the cryptographic device 100 may be protected from a hacker's attack, such as a differential power attack (DPA) and an attack through electromagnetic (EM) detection.

The encoder 130 encodes the 16 bits output from the second decoder 120 into a 4 bit output signal OUT and outputs the output signal OUT. The cryptographic device 100 shown in FIG. 1 may convert 6 bits of input signal IN into 4 bits of output signal OUT according to an S-Box many-to-one binary function.

Figure 2:
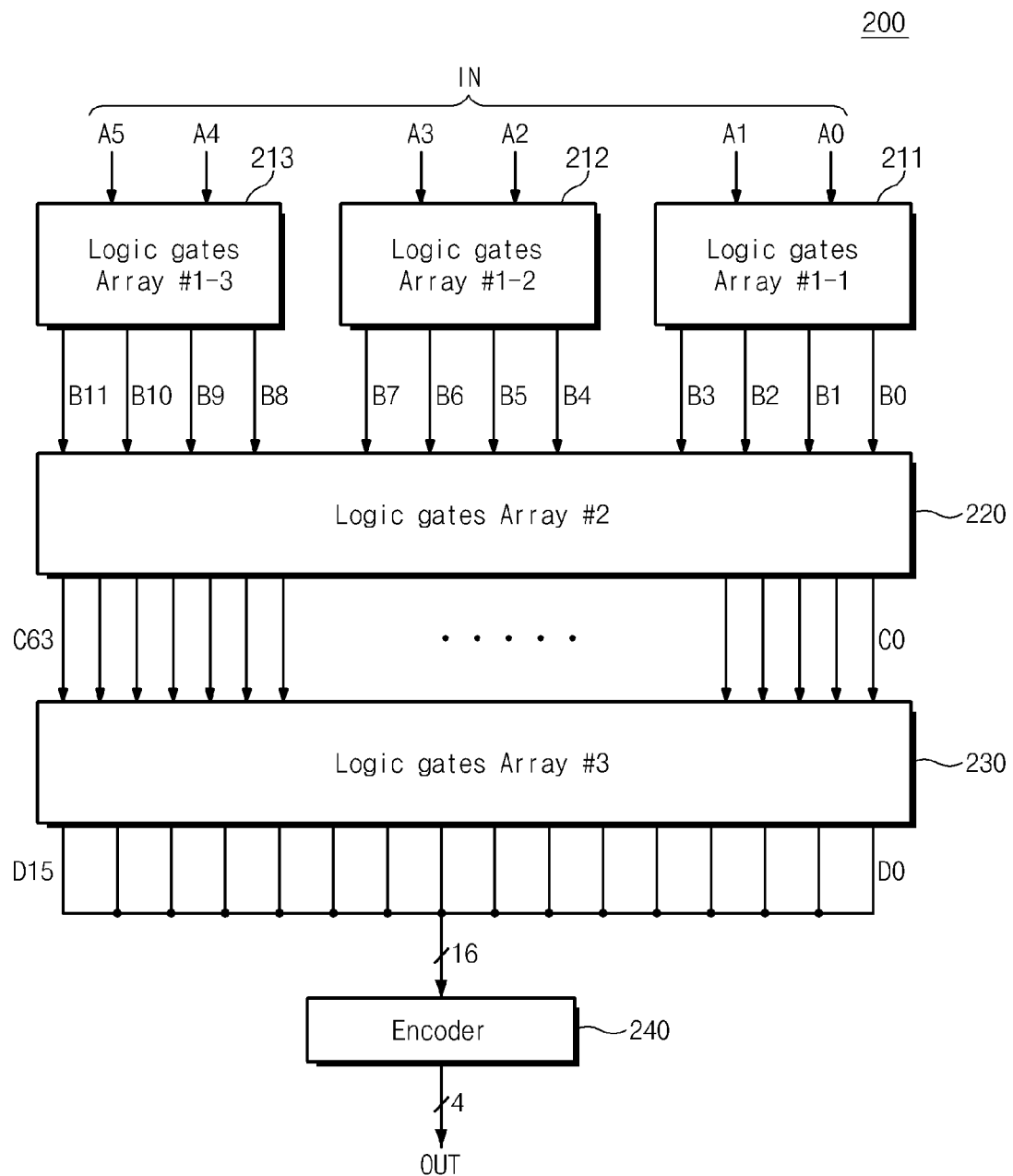
FIG. 2 illustrates a cryptographic device according to another exemplary embodiment.

FIG. 2 illustrates a cryptographic device 200 according to another exemplary embodiment. As illustrated, the cryptographic device 200 includes arrays 211, 212, and 213 of first logic gates, an array 220 of second logic gates, an array 230 of third logic gates, and an encoder 240. The array 211 of the first logic gates receives 2 bits A0 and A1 from among bits of an input signal IN and outputs 4 bits B0, B1, B2, and B3. The array 211 of the first logic gates includes a plurality of logic gates (not shown) each receiving 2 bits A0 and A1. The other arrays 212 and 213 of the first logic gates are organized with the same or similar circuit structure as the array 211 of the first logic gates and perform the same or similar operations as the array 211 of the first logic gates. Each of the arrays 211, 212, and 213 receives different 2 bits from among the bits of the input signal IN and outputs 4 bits. That is, the arrays 211, 212, and 213 output a total of 12 bits B0~B11.

The array 220 of the second logic gates receives the 12 bits from the arrays 211, 212, and 213 of the first logic gates and outputs 64 bits C0~C63. The array 220 of the second logic gates includes a plurality of logic gates (not shown) each receiving 1 bit from each of the arrays 211, 212, and 213 of the first logic gates (i.e., each receiving a total of 3 bits).

The array 230 of the third logic gates receives the 64 bits C0~C63 from the array 220 of the second logic gates and outputs 16 bits D0~D15 corresponding to the 64 bits C0~C63. The array 230 of the third logic gates includes a plurality of logic gates (not shown) each receiving 4 bits from among the 64 bits C0~C64 from the array 220 of the second logic gates. There is a many-to-one correspondence according to an S-Box binary function between 6 bits of the input signal IN and a K-bit signal input to the respective logic gates in the array 230 of the third logic gates.

The encoder 240 outputs the 16 bits D0~D15 output from the array 230 of the third logic gates, as a 4 bit signal OUT. The encoder 240 encodes the 16 bits D0~D15 into 4 bits of signal OUT. The encoder 240 may be designed to constantly consume current although the 16 bits of signals D0~D15 have any value. Thus, the cryptographic device 200 shown in FIG. 2 may substitute 6 bits of input signal IN with 4 bits of output signal OUT according to an S-Box binary function.

In the respective arrays 211, 212, 213, 220, and 230, one of respective logic gates constructed therein (i.e., a total five logic gates) outputs an active bit (or inactive bit) although an input signal IN has any value. Therefore, power is constantly consumed irrespective of the input signal IN.

Figure 3:
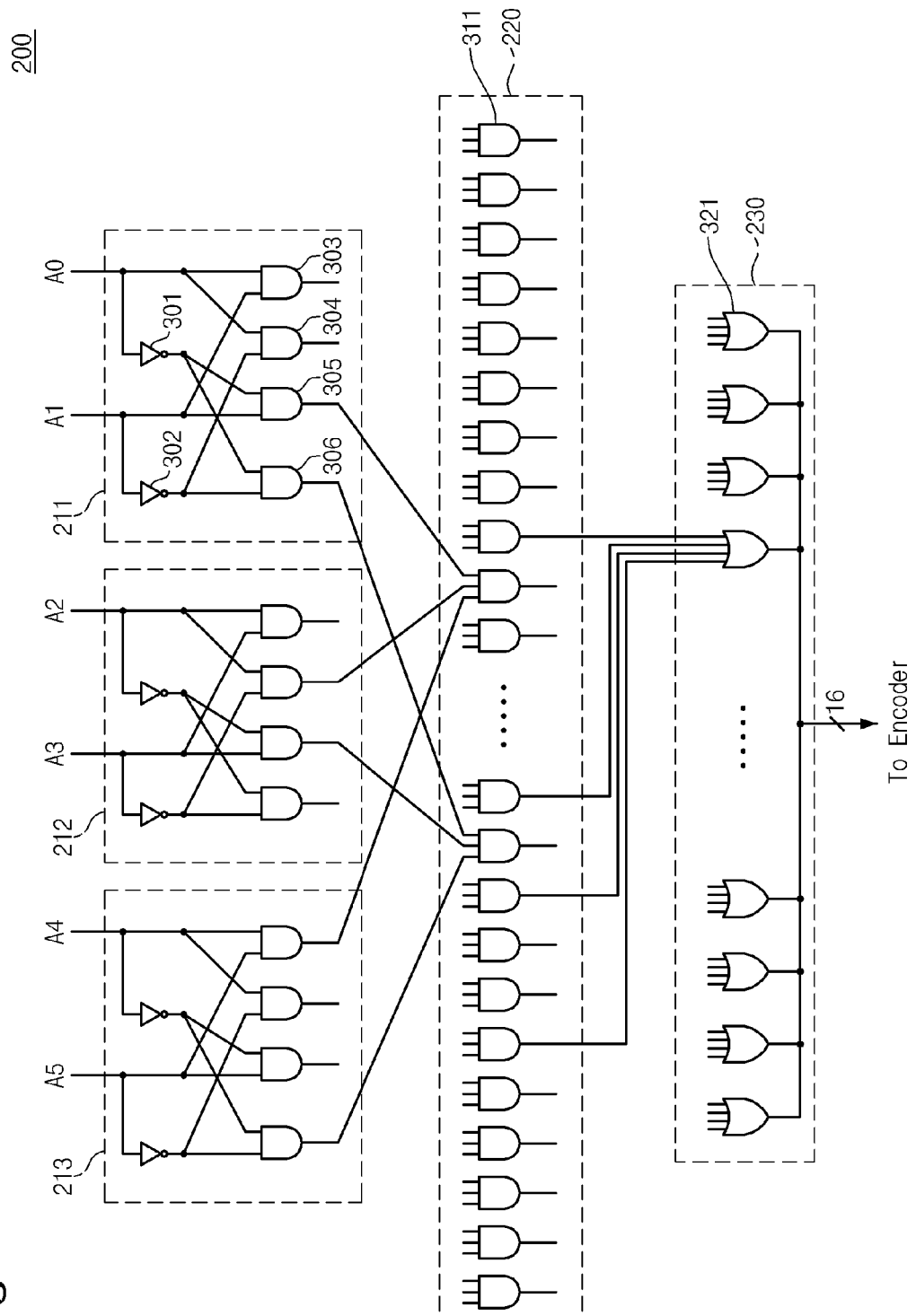
FIG. 3 illustrates a detailed circuit configuration of arrays of logic gates shown in FIG. 2 according to an exemplary embodiment.

FIG. 3 illustrates a detailed circuit configuration of arrays of logic gates shown in FIG. 2 according to an exemplary embodiment. Referring to FIG. 3, the array 211 of the first logic gates include two inverters 301 and 302 and four AND gates 303~306. The inverter 301 receives an input signal A0, and the inverter 302 receives an input signal A1. The AND gate 303 receives the input signals A0 and A1. The AND gate 304 receives the input signal A0 and an output of the inverter 302. The AND gate 305 receives an output of the inverter 301 and the input signal A1. The AND gate 306 receives outputs of the inverters 301 and 302. The array 211 of the first logic gates receive 2 bits A0 and A1 and outputs 4 bits through the AND gates 303~306. The arrays 212 and 213 of other first logic gates are organized with the same or similar structures as the array 211 of the first logic gates. The array 212 of the first logic gates receives input signals A2 and A3 and the array 213 of the first logic gates receives input signals A4 and A5.

In the array 211 of the first logic gates, only one AND gate among the four AND gates 303~306 is toggled according to the input signals A0 and A1. That is, only one bit among four bits B0~B3 output from the four AND gates 303~306 is an active bit that is a high level. Since the array 211 of the first logic gates always outputs one active bit for all cases of the input signals A0 and A1, current consumed at the array 211 of the first logic gates is always constant. Similar to the array 212 of the first logic gates, each of the other arrays 212 and 213 of the first logic gates outputs only one active bit.

The array 220 of the second logic gates includes 64 AND gates 311. Each of the AND gates 311 includes three input terminals and an output terminal. Furthermore, each of the AND gates 311 receives 1 bit from each of the arrays 211, 212, and 213 of the first logic gates (i.e., each of the AND gates 311 receives a total of 3 bits). More specifically, each of the AND gates 311 in the array 220 of the second logic gates receives 1 bit from among the 4 bits B0~B3, 1 bit from among the 4 bits B4~B7, and 1 bit from among the 4 bits B9~B11. The 64 bits C0~C63 output from the array 220 of the second logic gates are decoding signals according to the number of cases ($2^6$) of A0, A1, A2, A3, A4, and A5. Only one of the 64 AND gates 311 in the array 220 of the second logic gates is toggled according to 12 bits B0~B11 output from the arrays 211~213 of the first logic gates. That is, among the 64 bits C0~C63 output from the 64 AND gates 311 in the array 220 of the second logic gates, only one bit is an active bit.

The array 230 of the third logic gates includes 16 OR gates 321. Each of the OR gates 321 includes four input terminals and one output terminal. Each of the OR gates 321 receives 4 bits from among the 64 bits C0~C63 output from the array 230 of the second logic gates. The 4 bits input to each of the OR gates 321 are determined according to an S-Box lookup table.

FIG. 4 illustrates an S-Box lookup table according to an exemplary embodiment. Although a DES algorithm uses a total of eight S-Boxes, FIG. 4 shows one S-Box. Referring to FIG. 4, the lookup table shows 4 output bits to 6 bits of input signal A0~A5. Among the 6 bits A0~A5, 2 bits A0 and A5 designate rows of the lookup table and four bits A1, A2, A3, and A4 designate columns of the lookup table. For example, when the input signal A0~A5 is "110110", "0111" of a position designated by a column "1011" of a row "10" designated by the 2 bits A0 and A5 is selected as an output signal. In this case, the output signal "0111" is designated by not only the row "10" and the column "1011" but also a row "00" and a column "1111," a row "01" and a column "0010," and a row "11" and a column "0111." This is because the S-BOX uses a many-to-one binary function.

Returning to FIG. 3, the array 230 of the third logic gates always outputs the same 4 bits to four types of values of 6 bits of input signals A0~A5 according to the lookup table shown in FIG. 4. Thus, each of the OR gates 321 in the array 230 of the third logic gates receives 4 bits from among the 64 bits C0~C63 output from the AND gates 311 in the array 220 of the second logic gates. For example, when 6 bits of input signal A0~A5 are "011110," "000101," "110110," and "101111," an output signal is "0111." Therefore, an OR gate corresponding to "0111" in the array 230 of the third logic gates is connected to receive output signals of an AND gate corresponding to "011110," "000101," "110110," and "101111" in the array 220 of the second logic gates. Likewise, input terminals of the OR gates 321 in the array 230 of the third logic gates are connected to output signals of the AND gates 311 in the array 220 of the second logic gates according to the lookup table shown in FIG. 4. The 16 bits D0~D15 output from the array 230 of the third logic gates are provided to the encoder 240 shown in FIG. 2.

As illustrated in FIG. 3, AND gates in the arrays 211, 212, and 213 of the first logic gates and the array 220 of the second logic gates are toggled one by one. Further, any one of the OR gates in the array 230 of the third logic gates is toggled. Accordingly, a total of five logic gates are toggled at the arrays 211, 212, 213, 220, and 230 of the first to third logic gates although the input signals A0-A5 have any value. For this reason, the amount of current consumed at the arrays 211, 212, 213, 220, and 230 of the first to third logic gates is always constant irrespective of values of the input signals A0~A6. Accordingly, with a simple circuit configuration, an S-Box for DES algorithm is implemented using hardware, and a cryptographic device with security against a hacker's attack may be implemented.

The cryptographic device 200 shown in FIG. 3 is a cryptographic device implementing one S-Box. Eight cryptographic devices 200 are used to implement eight S-Boxes. In that case, the AND gates 311 in the array 220 of the second logic gates are connected to the OR gates 321 in the array 230 of the third logic gates according to a many-to-one correspondence between input and output signals of the S-Box.

As set forth in the above-described exemplary embodiments, an input signal IN is 6 bits and an output signal OUT is 4 bits. However, bit widths of the input signal IN and the output signal OUT may be variously changed. With the change in bit widths of the input signal IN and the output signal OUT, the number of the arrays 211, 212, and 213 of the first logic gates, the number of the AND gates 311 in the array 220 of the second logic gates, and the number of the OR gates 230 in the third logic gates are changed. However, a many-to-one correspondence between the input signal IN and the output signal OUT is established.

Figure 5:
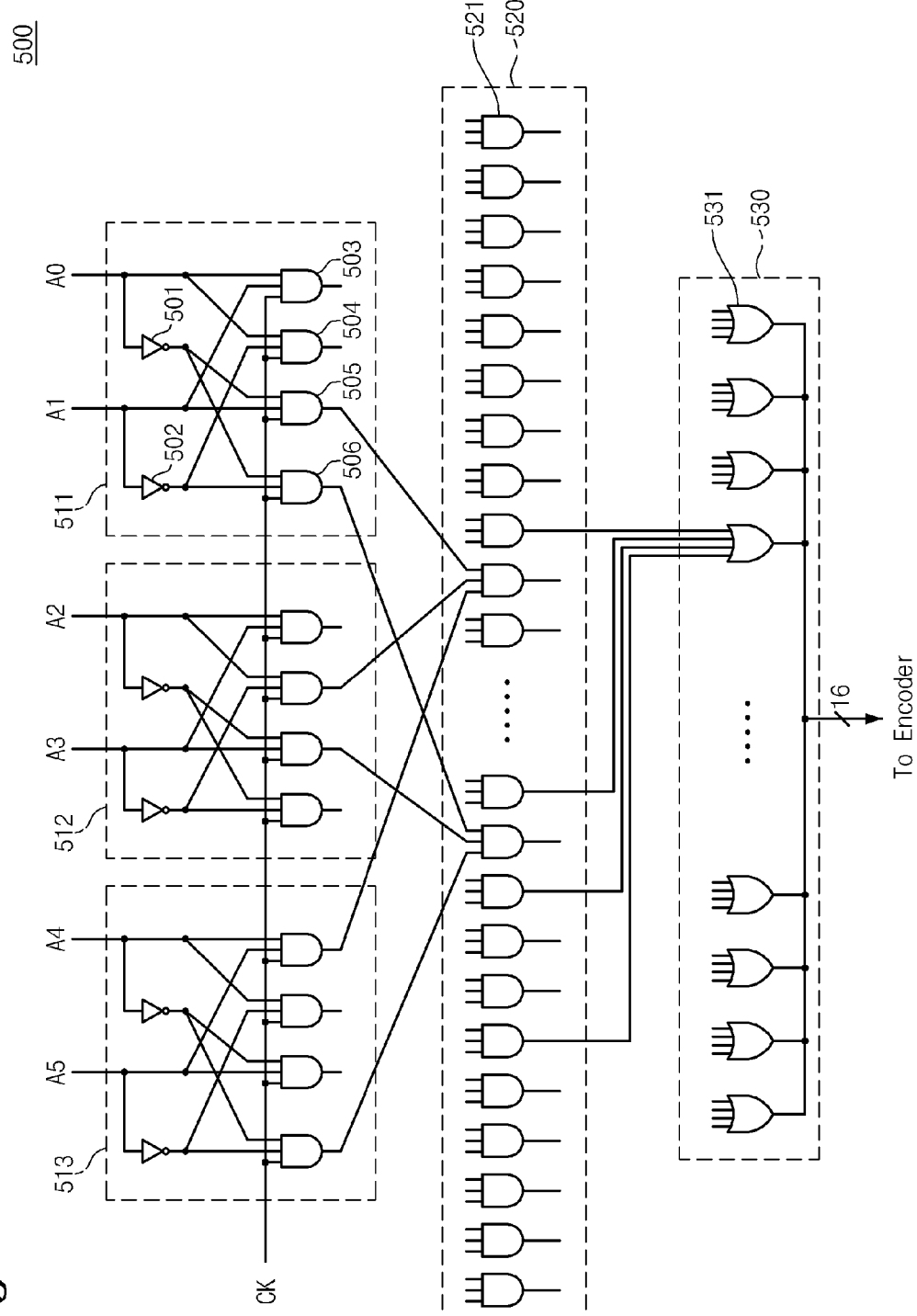
FIG. 5 illustrates an example of a cryptographic device having a reset function according to an exemplary embodiment.

FIG. 5 illustrates an example of a cryptographic device 500 having a reset function according to an exemplary embodiment. Unlike the cryptographic device 300 illustrated in FIG. 3, the cryptographic device 500 further inputs a clock signal CK to AND gates in arrays 511~513 of first logic gates. If a previous output signal is logic "1," the AND gates invert the output signal into logic "0" at a low level of the clock signal CK. In this case, the amount of current consumption is not changed because only 1 bit transitions to an inactive state. Moreover, in the case that input bits A0~A5 have the same value during a previous cycle and a current cycle of the clock signal CK, it is possible to solve a problem that output bits of the arrays 511~513 of the first logic gates do not turn to active/inactive bit.

Figure 6:
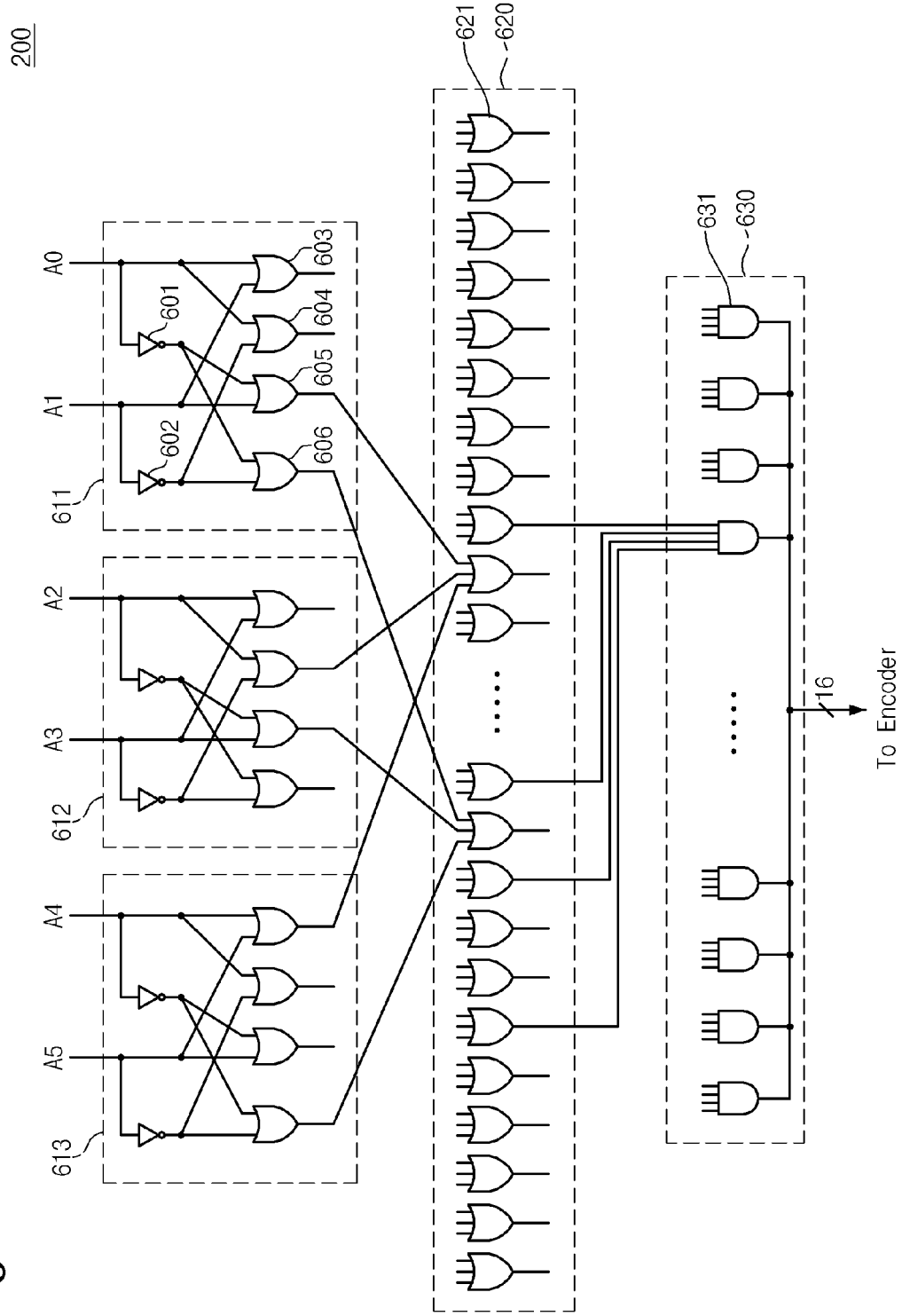
FIG. 6 illustrates a circuit configuration of arrays of logic gates shown in FIG. 2 according to another exemplary embodiment.

FIG. 6 illustrates another circuit configuration of arrays of logic gates shown in FIG. 2 according to another exemplary embodiment. Referring to FIG. 6, unlike FIG. 3, arrays 611~613 of first logic gates include OR gates 603~606, an array 620 of second logic gates includes OR gates 621, and an array 630 of third logic gates includes AND gates 631.

Although input signals A0~A5 have any value like in FIG. 3, only five logic gates are toggled at arrays 611, 612, 613, 620, and 630 of first to third logic gates shown in FIG. 6. Signals output from the arrays 611, 612, 613, 620, and 630 of the first to third logic gates include five inactive bits with the other bits being active bits. Likewise even when the arrays 211, 212, 213, 220, and 230 of the first to third logic gates illustrated in FIG. 3 are substituted with the arrays 611, 612, 613, 620, and 630 of the first to third logic gates, the amount of current consumed at the arrays 611, 612, 613, 620, and 630 of the first to third logic gates is always constant irrespective of values of the input signals A0~A6.

To sum up, when an S-Box operation is carried out, constant current is always consumed to prevent internal data from leaking to hackers.

While exemplary embodiments have been described with reference to the accompanying drawings, it will be apparent to those skilled in the art that various changes and modifications may be made without departing from the spirit and scope of the present inventive concept. Therefore, it should be understood that the above exemplary embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A cryptographic device comprising:
    arrays of first logic gates comprising I first logic gates which each receive 2 bits from among N bits of an input signal;
    $2^N$ second logic gates which each receive corresponding J bits from among I bits output from the arrays of the first logic gates; and
    L third logic gates which each receive K bits from among $2^N$ bits output from the second logic gates,
    wherein the I bits, the $2^N$ bits, and L bits respectively output from the arrays of the first logic gates, the second logic gates, and the third logic gates each have only one active bit,
    wherein there is a many-to-one correspondence between the N bits of the input signal and the K bits input to each of the third logic gates,
    wherein N, I, J, K, and L are positive integers, respectively,
    wherein each of the arrays of the first logic gates receives different 2 bits from among the N bits of the input signal, and
    wherein the first logic gates, the second logic gates, and the third logic gates are circuit logic gates.

2. The cryptographic device as set forth in claim 1, wherein each of the arrays of the first logic gates comprises first AND gates and performs an AND operation on the 2 bits respectively received from among the N bits of the input signal to output the I bits.

3. The cryptographic device as set forth in claim 2, wherein the second logic gates comprise second AND gates and each performs an AND operation on the corresponding J bits from among the I bits output from the arrays of the first logic gates to output the $2^N$ bits.

4. The cryptographic device as set forth in claim 3, wherein:
    a number of the arrays of the first logic gates is J; and
    each of the second logic gates receives 1 bit from each of the arrays of the first logic gates, from among the I bits output from the arrays of the first logic gates, to output the $2^N$ bits.

5. The cryptographic device as set forth in claim 2, wherein the third logic gates comprise OR gates and each perform an OR operation on the K bits from among the $2^N$ bits output from the second logic gates to output the L bits.

6. The cryptographic device as set forth in claim 2, wherein each of the first AND gates further receives a clock signal.

7. The cryptographic device as set forth in claim 1, wherein the many-to-one correspondence between the N bits of the input signal and the K bits input to each of the third logic gates is based on a many-to-one binary function in an S-Box of a data encryption standard (DES) algorithm.

8. The cryptographic device as set forth in claim 1, wherein each of the arrays of the first logic gates comprises first OR gates and performs an OR operation on the 2 bits respectively received from among the N bits of the input signal to output the I bits.

9. The cryptographic device as set forth in claim 8, wherein the second logic gates comprise second OR gates and each performs an OR operation on the corresponding J bits from among the I bits output from the arrays of the first logic gates to output the $2^N$ bits.

10. The cryptographic device as set forth in claim 9, wherein the third logic gates comprise AND gates and each perform an AND operation on the K bits from among the $2^N$ bits output from the second logic gates to output the L bits.

11. The cryptographic device as set forth in claim 1, wherein N is 6, I is 12, J is 3, L is 16, and K is 4.

12. The cryptographic device as set forth in claim 1, further comprising:
an encoder which encodes the L bits output from the third logic gates to output P bits of an output signal,
wherein P is a positive integer.

13. The cryptographic device as set forth in claim 12, wherein P is 4.

14. A cryptographic device comprising:
an array of first logic gates which receives first 2 bits among 6 bits of an input signal and which outputs first 4 bits;
an array of second logic gates which receives second 2 bits among the 6 bits of the input signal and which outputs second 4 bits;
an array of third logic gates which receives third 2 bits among the 6 bits of the input signal and which outputs third 4 bits;
64 fourth logic gates which each receive corresponding 3 bits from among the first, second, and third 4 bits output from the arrays of the first, second, and third logic gates; and
16 fifth logic gates which each receive 4 bits from among 64 bits output from the fourth logic gates,
wherein the first, second, and third 4 bits, the 64 bits, and the 16 bits respectively output from the arrays of the first, second, and third logic gates, the fourth logic gates, and the fifth logic gates each have only one active bit,
wherein there is a many-to-one correspondence between the 6 bits of the input signal and the 4 bits input to each of the fifth logic gates, and
wherein the first logic gates, the second logic gates, the third logic gates, the fourth logic gates, and the fifth logic gates are circuit logic gates.

15. The cryptographic device as set forth in claim 14, wherein each of the arrays of the first, second, and third logic gates comprises four first AND gates and performs an AND operation on the 2 bits respectively received from among the 6 bits of the input signal to output the respective 4 bits.

16. The cryptographic device as set forth in claim 15, wherein each of the fourth logic gates comprises a second AND gate and performs an AND operation on the corresponding 3 bits from among the first, second, and third 4 bits output from the arrays of the first, second, and third logic gates.

17. The cryptographic device as set forth in claim 15, wherein each of the fifth logic gates comprises an OR gate and performs an OR operation on the 4 bits from among the 64 bits output from the fourth logic gates.

18. The cryptographic device as set forth in claim 15, wherein each of the first AND gates further receives a clock signal.

19. The cryptographic device as set forth in claim 14, wherein the many-to-one correspondence between the 6 bits of the input signal and the 4 bits input to each of the fifth logic gates is based on a many-to-one binary function in an S-Box of a data encryption standard (DES) algorithm.

20. The cryptographic device as set forth in claim 14, wherein each of the arrays of the first, second, and third logic gates comprises first OR gates and performs an OR operation on the 2 bits respectively received from among the 6 bits of the input signal to output the 4 bits.

21. The cryptographic device as set forth in claim 20, wherein each of the fourth logic gates comprises a second OR gate and performs an OR operation on the corresponding 3 bits from among the 4 bits output from the arrays of the first, second, and third logic gates.

22. The cryptographic device as set forth in claim 21, wherein each of the fifth logic gates comprises an AND gate and performs an AND operation on the respective 4 bits from among the 64 bits output from the fourth logic gates.

23. A cryptographic device comprising:
a first decoder which decodes an input signal of N bits into $2^N$ bits; and
a second decoder which decodes the $2^N$ bits output from the first decoder into L bits,
wherein the $2^N$ bits output from the first decoder and the L bits output from the second decoder each include only one active bit,
wherein N and L are positive integers,
wherein the first decoder comprises arrays of first logic gates comprising I first logic gates which each receive 2 bits from among the N bits of the input signal,
wherein each of the arrays of the first logic gates receives different 2 bits from among the N bits of the input signal, and
wherein the first logic gates are circuit logic gates.

24. The cryptographic device as set forth in claim 23, further comprising an encoder which encodes the L bits output from the second decoder into a K bit output signal.

25. A cryptographic method comprising:
receiving, at each of arrays of first logic gates comprising I first logic gates, 2 bits from among N bits of an input signal;
receiving, at each of $2^N$ second logic gates, corresponding J bits from among I bits output from the arrays of the first logic gates; and
receiving, at each of L third logic gates, K bits from among $2^N$ bits output from the second logic gates,
wherein the I bits, the $2^N$ bits, and L bits respectively output from the arrays of the first logic gates, the second logic gates, and the third logic gates each have only one active bit,
wherein there is a many-to-one correspondence between the N bits of the input signal and the K bits input to each of the third logic gates,
wherein the N, I, J, K, and L are positive integers, respectively, wherein each of the arrays of the first logic gates receives different 2 bits from among the N bits of the input signal, and wherein the first logic gates, the second logic gates, and the third logic gates are circuit logic gates.

* * * * *